(12) United States Patent
Motoi

(10) Patent No.: US 8,989,496 B2
(45) Date of Patent: Mar. 24, 2015

(54) ELECTRONIC APPARATUS AND HANDWRITTEN DOCUMENT PROCESSING METHOD

(71) Applicant: Kabushiki Kaisha Toshiba, Tokyo (JP)

(72) Inventor: Shigeru Motoi, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 13/680,461

(22) Filed: Nov. 19, 2012

(65) Prior Publication Data

US 2014/0086489 A1 Mar. 27, 2014

(30) Foreign Application Priority Data

Sep. 26, 2012 (JP) ................................. 2012-213200

(51) Int. Cl.
G06K 9/34 (2006.01)
G06K 9/18 (2006.01)
G06K 9/00 (2006.01)

(52) U.S. Cl.
CPC .............. *G06K 9/18* (2013.01); *G06K 9/00402* (2013.01)
USPC .......................................... 382/187; 382/178

(58) Field of Classification Search
CPC .............. H04N 2201/0087; H04N 2201/0422; H04N 2201/0438; H04N 1/00355; H04N 1/0036; H04N 1/00405; H04N 1/00411; H04N 1/0044; H04N 1/00482; H04N 1/10; H04N 1/32032; H04N 1/32112; H04N 1/32128; H04N 2201/0081; H04N 2201/0093; H04N 2201/3207; H04N 2201/3209; H04N 2201/3214; H04N 2201/3226; H04N 2201/3249; H04N 2201/3264; H04N 2201/3271; G06K 9/18; G06K 9/00; G06K 9/00402; H01H 2003/008; H01H 2215/052; G06F 3/0488
USPC .......... 382/178, 101, 179, 187, 275, 310, 190
See application file for complete search history.

(56) References Cited

U.S. PATENT DOCUMENTS

| 5,588,073 | A | * | 12/1996 | Lee et al. ....................... 382/187 |
| 6,108,445 | A | * | 8/2000 | Uehara ........................... 382/189 |
| 6,144,764 | A | * | 11/2000 | Yamakawa et al. ........... 382/187 |
| 7,447,360 | B2 | * | 11/2008 | Li et al. .......................... 382/186 |
| 7,561,739 | B2 | * | 7/2009 | Xu et al. ........................ 382/186 |
| 8,306,330 | B2 | * | 11/2012 | Kawamoto et al. ........... 382/187 |
| 8,423,916 | B2 | * | 4/2013 | Chihara et al. ................ 715/863 |

FOREIGN PATENT DOCUMENTS

| JP | 2002-049891 A | 2/2002 |
| JP | 2002-109471 A | 4/2002 |
| JP | 2011-028697 A | 2/2011 |

\* cited by examiner

*Primary Examiner* — Sheela Chawan
(74) *Attorney, Agent, or Firm* — Knobbe, Martens, Olson & Bear LLP

(57) ABSTRACT

According to one embodiment, an electronic apparatus includes a display processor, and a correction calculator. The display processor is configured to display strokes corresponding to coordinates of loci of contact points on a display. The correction calculator is configured to calculate a correction direction and a correction quantity to correct a coordinate, by using a position of a first handwritten character recognizable from the strokes and a position of a second handwritten character recognizable from the strokes.

18 Claims, 6 Drawing Sheets

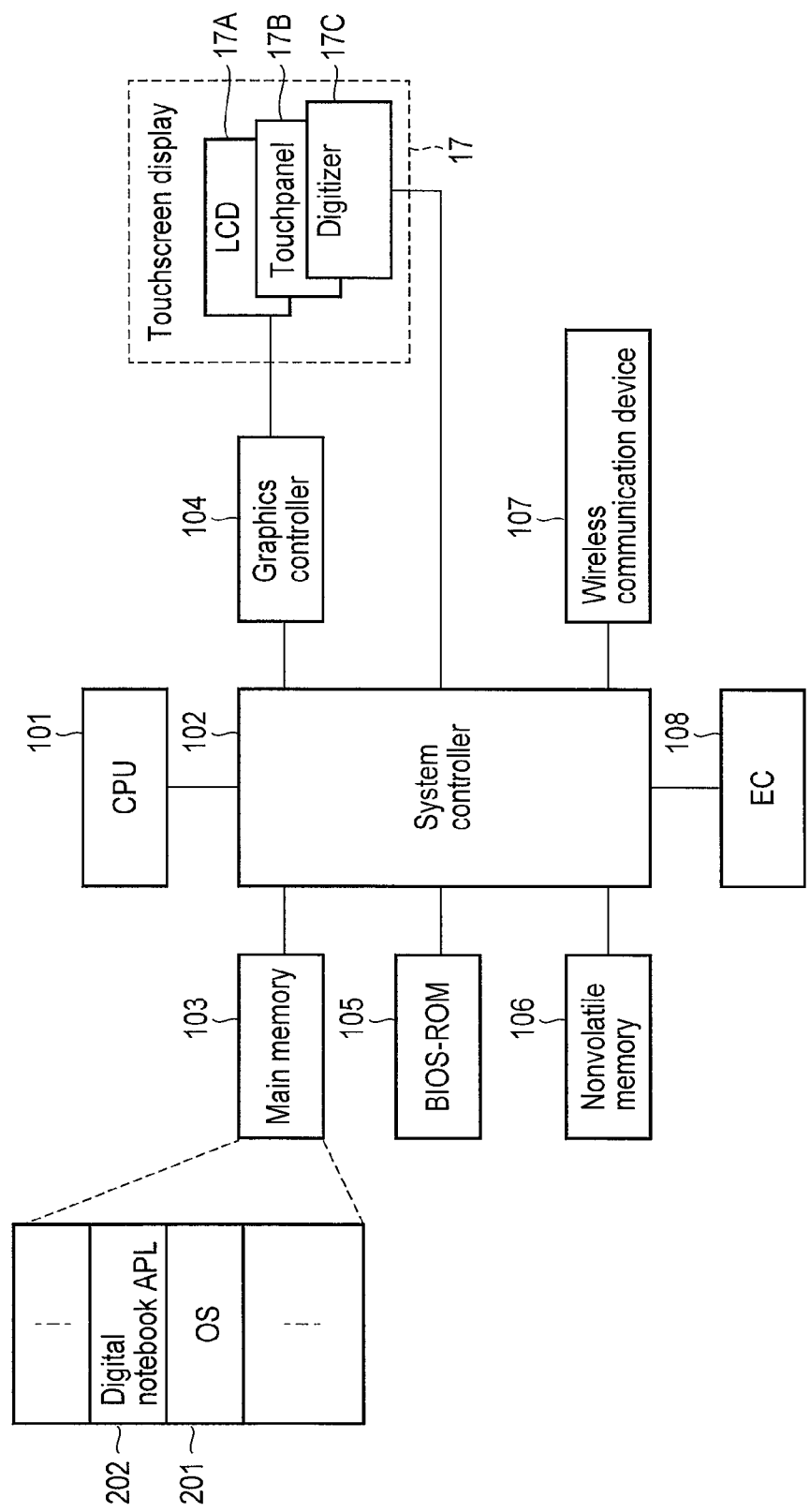
F I G. 2

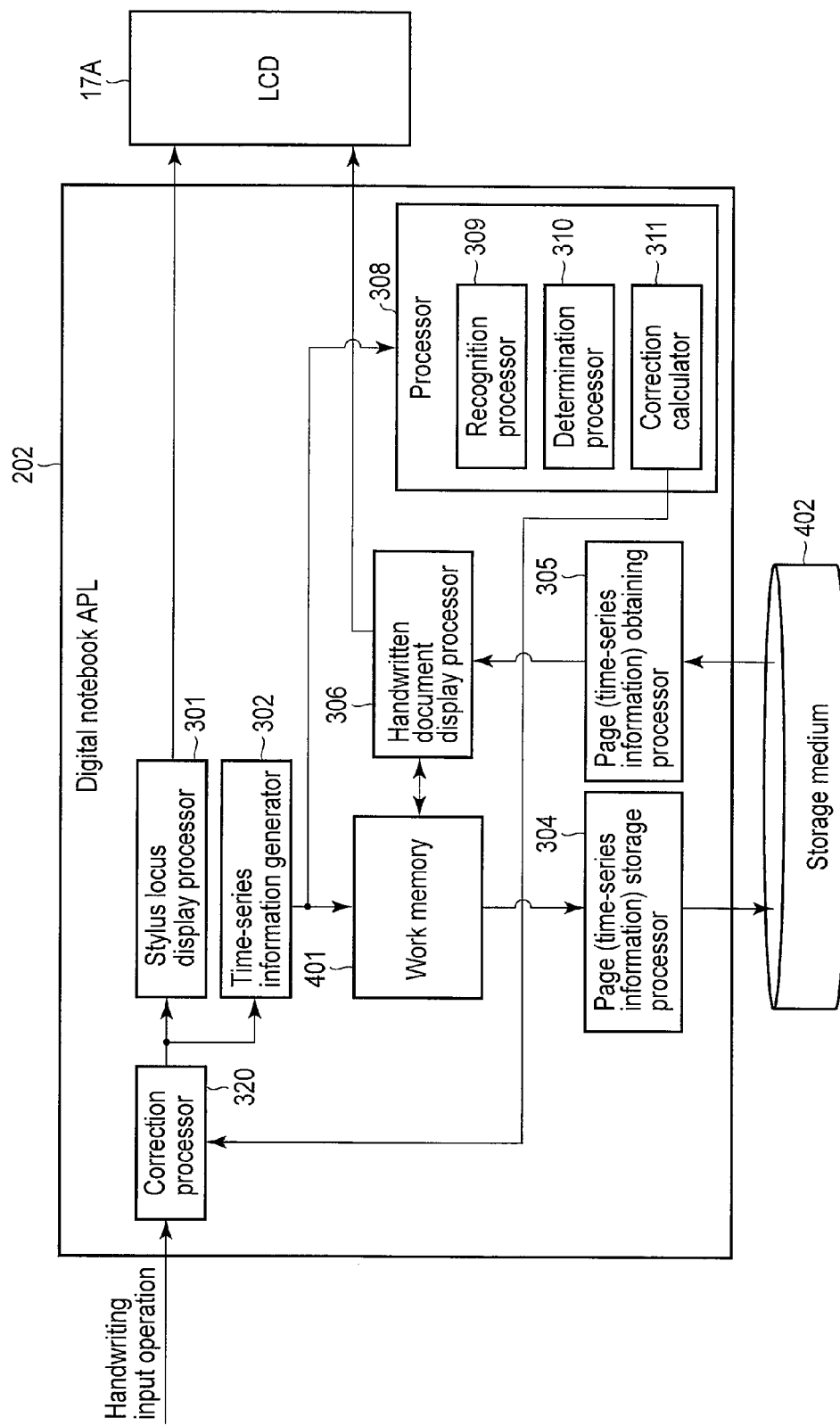
F I G. 3

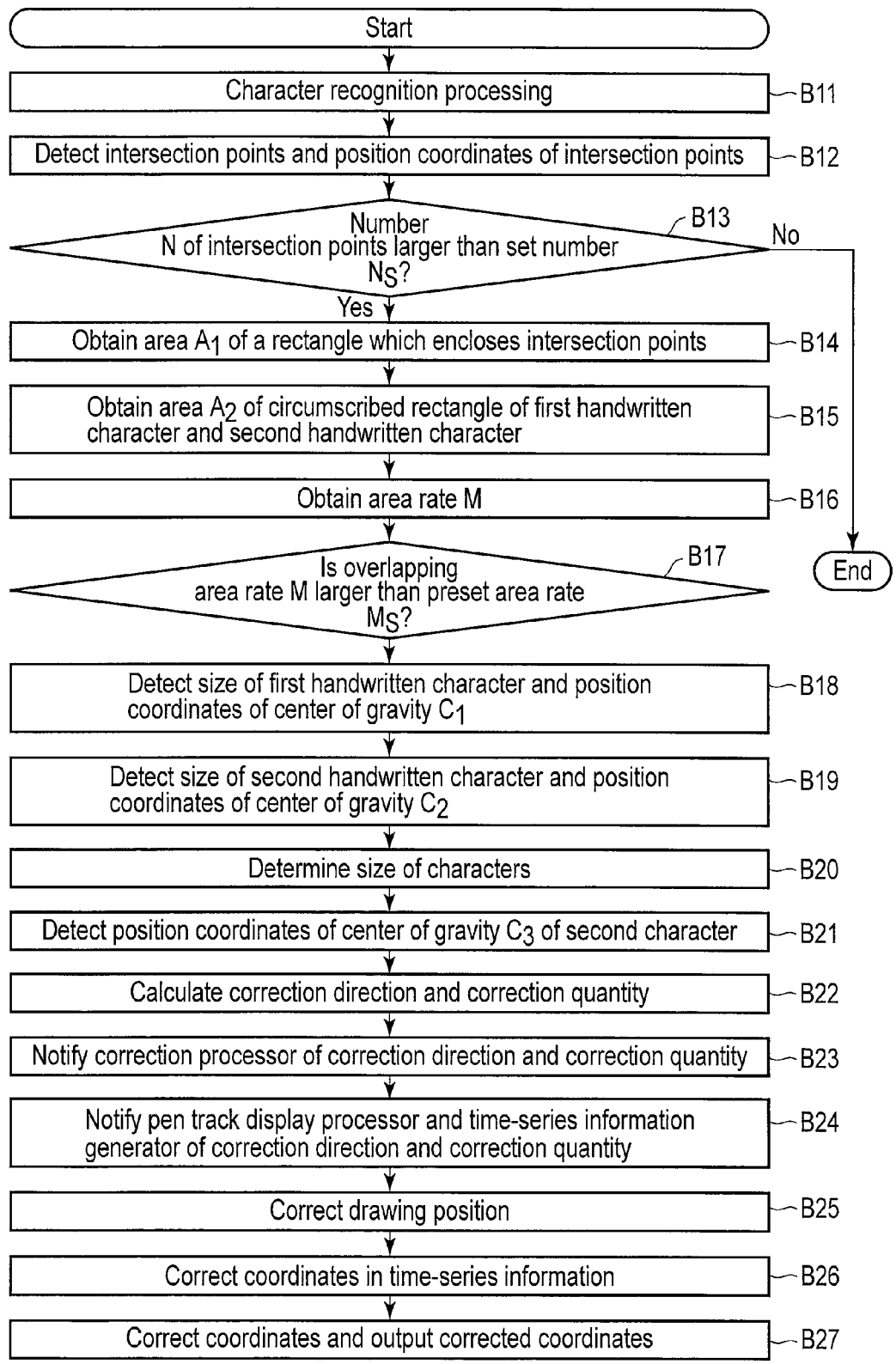
F I G. 4

ELECTRONIC APPARATUS AND HANDWRITTEN DOCUMENT PROCESSING METHOD

CROSS-REFERENCE TO RELATED APPLICATIONS

This application is based upon and claims the benefit of priority from Japanese Patent Application No. 2012-213200, filed Sep. 26, 2012, the entire contents of which are incorporated herein by reference.

FIELD

Embodiments described herein relate generally to processing of handwritten documents.

BACKGROUND

In input using an inductive digitizer, there are cases where a locus of the stylus is shifted from a line which is displayed on a display screen of the display, and characters overlap each other. To solve the above problem, there are a method of executing calibration when necessary, and a method of correcting the display position by using the inclination of the stylus.

It is troublesome, however, to perform calibration for each usage environment, such as the case where the user in a sitting position uses the apparatus, the case where the user in a lying position uses the apparatus, the case where the computer is used in the state of being held by the user, and the computer is used in a state of being placed on a desk. In addition, to feed back inclination of the stylus to the tablet, a module for performing communication with the stylus is required, and providing such a module may increase the cost and the weight of the stylus.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram of a system configuration of the electronic apparatus according to the embodiment.

FIG. 3 an exemplary a block diagram illustrating a functional configuration of a digital notebook application program.

FIG. 4 is an exemplary flowchart illustrating an example of procedure of correction processing.

DETAILED DESCRIPTION

Various embodiments will be described hereinafter with reference to the accompanying drawings.

In general, according to one embodiment, an electronic apparatus includes a display processor, and a correction calculator. The display processor is configured to display strokes corresponding to coordinates of loci of contact points on a display. The correction calculator is configured to calculate a correction direction and a correction quantity to correct a coordinate, by using a position of a first handwritten character recognizable from the strokes and a position of a second handwritten character recognizable from the strokes.

Figure 1:
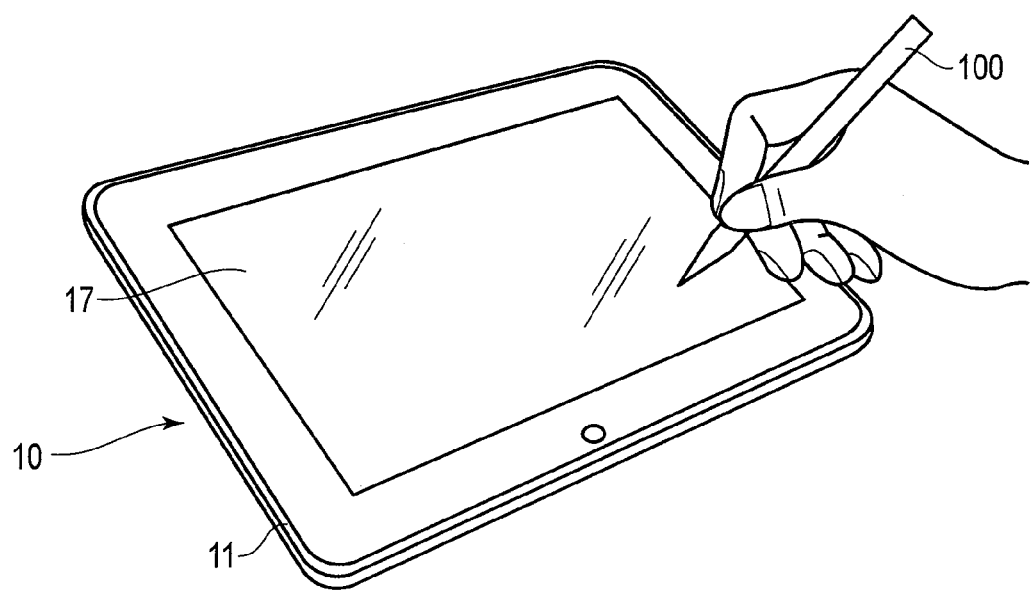
FIG. 1 is an exemplary perspective view illustrating an external appearance of an electronic apparatus according to an embodiment.
Figure 5:
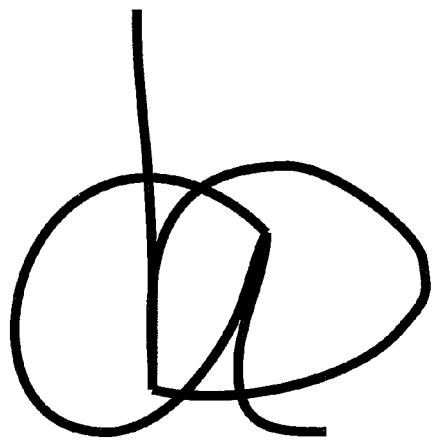
FIG. 5 is an exemplary diagram for explaining the correction processing.

FIG. 1 is a perspective view illustrating an external appearance of an electronic apparatus according to an embodiment. The electronic apparatus is, for example, a stylus-based portable electronic apparatus which enables handwriting input by a stylus or a finger. The electronic apparatus can be realized as a tablet computer, a notebook computer, a smartphone, or a PDA. In the following explanation, suppose that the electronic apparatus is realized as a tablet computer 10. The tablet computer 10 is a portable electronic apparatus which is also referred to as a tablet or a slate computer. As illustrated in FIG. 1, the tablet computer 10 includes a main body 11 and a touchscreen display 17. The touchscreen display 17 is attached to and superposed on an upper surface of the main body 11.

The main body 11 includes a housing which has a thin box shape. A flat panel display and a sensor which is configured to sense a position on a screen of the flat panel display, which the stylus or finger touches, are put in the touchscreen display 17. The flat panel display may be, for example, a liquid crystal display (LCD). It is possible to use, for example, a capacitive touchpanel or an inductive digitizer as the sensor. In the following explanation, suppose that both two sensors, that is, a digitizer and a touchpanel, are incorporated in the touchscreen display 17.

Each of the digitizer and the touchpanel are provided to cover the screen of the flat panel display. The touchscreen display 17 can detect not only a touch operation on the screen using the user's finger, but also a touch operation on the screen using a stylus 100. The stylus 100 may be, for example, an electromagnetic inductive stylus. The user can perform handwriting input operation on the touchscreen display 17, by using an external object (stylus 100 or finger). During the handwriting input operation, loci of movement of the external object (stylus 100 or finger) on the screen, that is, loci (handwriting) of strokes which are made by a handwriting input operation are drawn in real time, and thereby loci of the strokes are displayed on the screen. A locus of movement of the external object which is made while the external object is in contact with the screen corresponds to a stroke. A group of a number of strokes which correspond to handwritten characters or figures, that is, a group of a number of loci (handwriting) forms a handwritten document.

In the present embodiment, the handwritten document is stored in a storage medium, not as image data, but as time-series information which indicates a coordinate line of a locus of each stroke and the order relation between strokes. The time-series information generally indicates a set of time-series stroke data items which correspond to respective strokes. Each stroke data item corresponds to a stroke, and includes a coordinate data series (time-series coordinates) which correspond to respective dots located on the locus of the stroke. The order of arrangement of the stroke data items corresponds to the writing order of the strokes, that is, the stroke order.

The tablet computer 10 reads out desired existing time-series information from the storage medium, and can display a handwritten document which corresponds to the time-series information, that is, loci which correspond to respective strokes indicated by the time-series information, on the screen. The tablet computer 10 also has an edit function. By the edit function, the user can delete or move any stroke or any handwritten character in the displayed handwritten document, in response to edit operation performed by the user by using an "eraser" tool, a range designation tool, or another tool. In addition, the edit function also includes a function of cancelling history of some handwriting operations.

In the present embodiment, the time-series information (handwritten document) can be managed as one or a plurality of pages. In this case, the time-series information (handwritten document) may be divided for each area which is contained in one picture, and thereby a mass of time-series information which is contained in one picture may be recorded as one page. As another example, the size of the page may be variable. In this case, since the size of the page can be increased to an area which is larger than the size of one screen, a handwritten document of a size which is larger than the screen size can be dealt with as one page. When the whole page cannot be simultaneously displayed on the display, the page may be reduced, or the displayed part in the page may be changed by vertical and horizontal scroll.

FIG. 2 is a diagram illustrating a system configuration of the tablet computer 10.

As illustrated in FIG. 2, the tablet computer 10 comprises a CPU 101, a system controller 102, a main memory 103, a graphics controller 105, a BIOS-ROM 105, a nonvolatile memory 106, a wireless communication device 107, and an embedded controller (EC) 108.

The CPU 101 is a processor which controls operation of various modules in the tablet computer 10. The CPU 101 executes various software loaded from the nonvolatile memory 106, which is a storage device, into the main memory 103. The software includes an operating system (OS) 201, and various application programs. The application programs include a digital notebook application program 202. The digital notebook application program 202 includes a function of preparing and displaying the handwritten document, a function of editing the handwritten document, and a character and diagram recognition function.

The CPU 101 also executes a basic input/output system (BIOS) which is stored in the BIOS-ROM 105. The BIOS is a program for hardware control.

The system controller 102 is a device which connects a local bus of the CPU 101 with various components. The system controller 102 also includes a memory controller which controls access to the main memory 103. The system controller 102 also includes a function of executing communication with the graphics controller 104 through a serial bus of the PCI EXPRESS standard.

The graphics controller 104 is a display controller which controls the LCD 17A that is used as the display monitor of the tablet computer 10. A display signal which is generated by the graphics controller 104 is transmitted to the LCD 17A. The LCD 17A displays a picture image based on the display signal. A touchpanel 17B and a digitizer 17C are arranged on the LCD 17A. The touchpanel 17B is a capacitive pointing device for performing input on the screen of the LCD 17A. The touchpanel 17B detects a touching position on the screen, in which the user's finger touches the screen, and movement of the touching position. The digitizer 17C is an inductive pointing device for performing input on the screen of the LCD 17A. The digitizer 17C detects a touching position on the screen, in which the stylus 100 touches the screen, and movement of the touching position. The digitizer 17C outputs coordinates which indicate the position of the stylus 100 on the screen.

The wireless communication device 107 is a device configured to execute wireless communication such as wireless LAN and 3G mobile communication. The EC 108 is a one-chip microcomputer which includes an embedded controller for electric power control. The EC 108 has a function of turning on and off the tablet computer 10, in response to operation of the power button by the user.

Next, a functional configuration of the digital notebook application program 202 will be explained hereinafter with reference to FIG. 3.

The digital notebook application program 202 includes a stylus locus display processor 301, a time-series information generator 302, a page storage processor 304, a page obtaining processor 305, a handwritten document display processor 306, and a processor 308.

The digital notebook application program 202 prepares, displays, and edits a handwritten document, by using stroke data items which are input by using the touchscreen display 17. The touchscreen display 17 is configured to detect occurrence of events such as "touch", "slide", and "release".

The event "touch" is an event which indicates a touch of an external object on the screen. The event "slide" is an event which indicates that the touching position is moved while the external object is in contact with the screen. The event "release" is an event which indicates that the external object is separated from the screen.

The stylus locus display processor 301 and the time-series information generator 302 receive the event "touch" or "slide" which is generated by the touchscreen display 17, and thereby detect a handwriting input operation. The event "touch" includes coordinates of the touching position. The event "slide" also includes coordinates of the touch position after sliding. Therefore, the stylus locus display processor 301 and the time-series information generator 302 can receive a coordinate line which corresponds to the locus of movement of the touch position, from the touchscreen display 17.

The stylus locus display processor 301 receives coordinate lines from the touchscreen display 17, and displays loci of strokes which are written by hand by a handwriting input operation using the stylus 100 or the like on the screen of the LCD 17A in the touchscreen display 17, based on the coordinate lines. The stylus locus display processor 301 draws loci of the stylus 100 which are made while the stylus 100 is in contact with the screen, that is, loci of the strokes, on the screen of the LCD 17A.

The time-series information generator 302 receives the coordinate lines output from the touchscreen display 17, and generates time-series information based on the coordinate lines. In this case, the time-series information, that is, coordinates which corresponds to each point of the stroke and time stamp information may be temporarily stored in a work memory 320.

The page storage processor 304 stores the generated time-series information in a storage medium 402 as a handwritten document (handwritten page). The storage medium 402 may be either of the storage device in the tablet computer 10 and a storage device which is used over a network or USB.

The page obtaining processor 305 reads out desired time-series information, which has already been stored in the storage medium 402, from the storage medium 402. The read time-series information is transmitted to the handwritten document display processor 306. The handwritten document display processor 306 analyzes the time-series information, and displays loci of strokes indicated by the time-series information on the screen as a handwritten page, based on a result of the analysis.

The processor 308 can execute various processing for the time-series information to be processed. The processor 308 includes a recognition processor 309, a determination processor 310, a correction calculator 311, and a correction processor 320.

The recognition processor 309 executes recognition processing such as handwritten character recognition, handwritten figure recognition, and handwritten table recognition, for handwritten character lines or figures in the displayed time-series information (handwritten page).

The recognition processor 309 recognizes the time-series information in the work memory 401 as characters in real time, and converts each handwritten character into a character code. The recognition processor 309 can perform character recognition also for handwritten characters which overlap each other, by performing character recognition for the time-series information in real time.

The determination processor 310 determines whether a first handwritten character and a second handwritten character, which are input by handwriting and are adjacent to each other, overlap each other.

The correction calculator 311 calculates a correction direction and a correction quantity for correcting the coordinates which indicates the position of the stylus, when the determination processor 310 determines that two adjacent characters overlap.

The correction processor 320 corrects the coordinates output from the digitizer, based on the correction direction and the correction quantity which are calculated by the correction calculator 311, and outputs the corrected coordinates to the stylus locus display processor 301 and the time-series information generator 302.

FIG. 4 is a flowchart illustrating procedure of correction processing. FIG. 5 to FIG. 11 are diagrams for explaining the correction processing.

First, the recognition processor 309 executes character recognition processing for input handwritten characters, based on the time-series information in the work memory 401 (Block B11). For example, in the case of a first handwritten character and a second handwritten character illustrated in FIG. 5, the recognition processor 309 recognizes the first recognized character "a" and the second recognized character "b".

Figure 6:
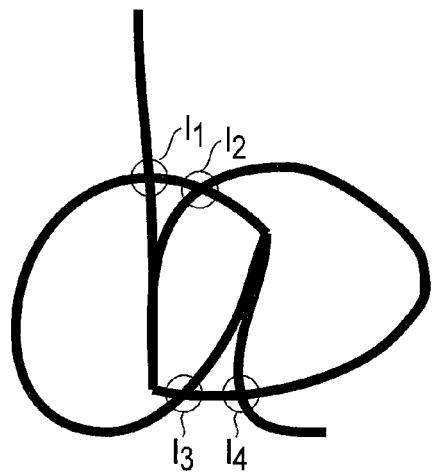
FIG. 6 is an exemplary diagram for explaining the correction processing.

Next, the determination processor 310 detects intersection points between the first handwritten character "a" and the second handwritten character "b", and position coordinates of the intersection points (Block B12). As illustrated in FIG. 6, the determination processor 310 detects four intersection points $I_1$, $I_2$, $I_3$, and $I_4$.

Figure 7:
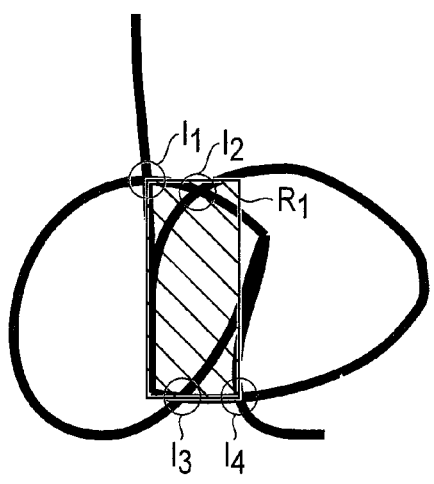
FIG. 7 is an exemplary diagram for explaining the correction processing.
Figure 8:
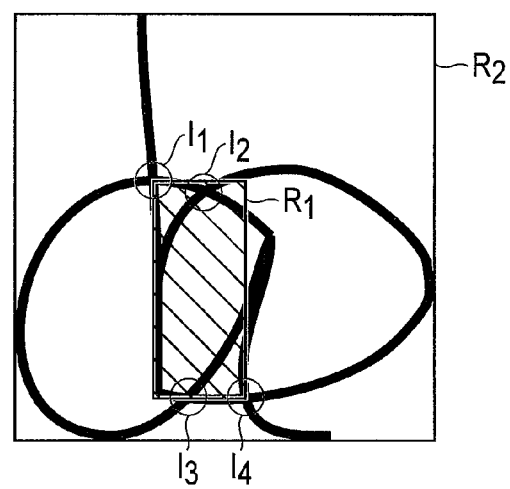
FIG. 8 is an exemplary diagram for explaining the correction processing.

The determination processor 310 determines whether the number N of the detected intersection points is larger than a set number $N_S$ (Block B13). When it is determined that the number N of the intersection points is larger than the set number $N_S$, the determination processor 310 obtains an area $A_1$ of a rectangle $R_1$ which encloses the intersection points between the first handwritten character "a" and the second handwritten character "b", based on the position coordinates of the intersection points (Block B14), as illustrated in FIG. 7. As illustrated in FIG. 8, the determination processor 310 obtains an area $A_2$ of a circumscribed rectangle $R_2$ of the first handwritten character "a" and the second handwritten character "b" (Block B15).

The determination processor 310 obtains an overlapping area rate M, which is a ratio of area $A_1$ to area $A_2$ (Block B16). The determination processor 310 determines whether the obtained overlapping area rate M is larger than a preset area rate $M_S$ (Block B17).

When it is determined that the overlapping area rate M is larger than the preset area rate $M_S$ (Yes of Block B17), the determination processor 310 determines that the first handwritten character "a" and the second handwritten character "b" overlap.

Figure 9:
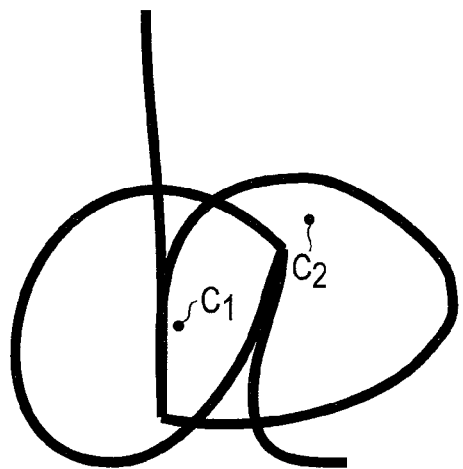
FIG. 9 is an exemplary diagram for explaining the correction processing.

When it is determined that the first handwritten character "a" and the second handwritten character "b" overlap, the correction calculator 311 detects the size of the first handwritten character "a" and position coordinates of center of gravity $C_1$ of the first handwritten character "a" (Block B18), as illustrated in FIG. 9. As illustrated in FIG. 9, the correction calculator 311 also detects the size of the second handwritten character "b" and position coordinates of center of gravity $C_2$ of the second handwritten character "b" (Block B19). The correction calculator 311 determines the size of characters (font) in accordance with the size of the first handwritten character "a" (Block B20). The correction calculator 311 determines the size of characters in accordance with the size of the first handwritten character "a", based on a table which indicates the size of characters for the size of the first handwritten character "a".

Figure 10:
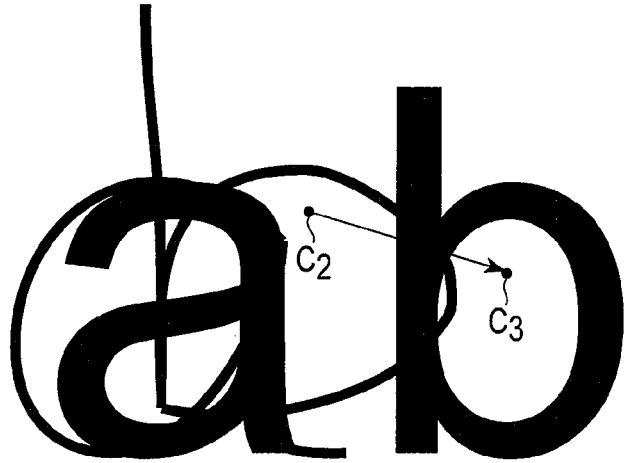
FIG. 10 is an exemplary diagram for explaining the correction processing.

As illustrated in FIG. 10, the correction calculator 311 detects position coordinates of center of gravity $C_3$ of the second recognized character "b" in the case where the first recognized character "a" and the second recognized character "b" are arranged with the determined character size such that the position coordinates of the center of gravity of the first recognized character "a" agrees with the position coordinates of center of gravity $C_1$ of the first handwritten character "a" (Block B21). The interval between the first recognized character "a" and the second recognized character "b" is determined in advance in accordance with the size of characters, and information of the character interval for the size is embedded in the font data. The correction calculator 311 calculates a vector $(x_2-x_1, y_2-y_1)$ which goes from the position coordinates $(x_1, y_1)$ of center of gravity $C_2$ of the second handwritten character "b" to the position coordinates $(x_2, y_2)$ of center of gravity $C_3$ of the second recognized character "b", as the correction direction and correction quantity (Block B22). The correction calculator 311 notifies the correction processor 320 of the vector $(x_2-x_1, y_2-y_1)$, as the correction direction and correction quantity (Block B23).

Figure 11:
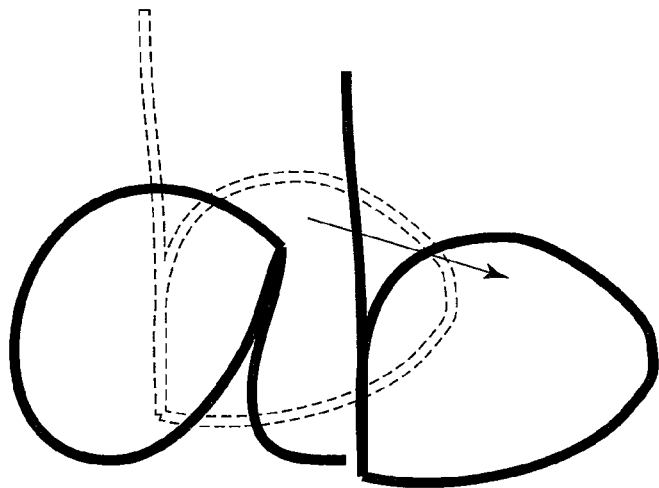
FIG. 11 is an exemplary diagram for explaining the correction processing.

The correction processor 320 notifies the stylus locus display processor 301 and the time-series information generator 302 of the vector $(x_2-x_1, y_2-y_1)$ as the correction direction and correction quantity (Block B24). As illustrated in FIG. 11, the stylus locus display processor 301 corrects the drawing position of the second handwritten character "b", in accordance with the notified correction direction and correction quantity (Block B25). The time-series information generator 302 corrects the coordinates which correspond to the second handwritten character "b" in the time-series information, in accordance with the notified correction direction and correction quantity (Block B26).

The correction processor 320 corrects the coordinates which are output from the digitizer 17C and indicate the position of the stylus, in accordance with the notified correction direction and correction quantity, and outputs the corrected coordinates to the stylus locus display processor 301 and the time-series information generator 302 (Block B27). The stylus locus display processor 301 displays loci of the stylus, based on the corrected coordinates. The time-series information generator 302 generates time-series information based on the corrected coordinates.

Character recognition is performed for a plurality of strokes, and the correction direction and correction quantity for correcting the coordinates which indicates the position of the stylus are calculated, based on the position of the center of gravity of the second character in the case where the first character and the recognized second character are displayed on the screen based on the position of the center of gravity of the first handwritten character which corresponds to the first recognized character and is displayed on the screen, and the position of the center of gravity of the second handwritten character which corresponds to the second character and is displayed on the screen. Thereby, it is possible to easily obtain the correction direction and correction quantity of the coordinates which indicate the position of the stylus.

The above embodiment shows the correction processing which is performed when alphabets are input. In the case where a Chinese character is input, it is desirable to recognize a radical of the Chinese character and the other part of the Chinese character separately from each other, and detect the overlapping area rate between the radical and the other part.

Various processing for the handwritten document in the present embodiment may be realized by a computer program, and thus the same effect as the present embodiment can easily be obtained only by installing the computer program in an ordinary computer including a touchscreen display, and executing the computer program, through a computer-readable storage medium which stores the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display capable of detecting a coordinate corresponding to a contact position on a surface of the display;
a display circuitry to display first strokes input by loci of contact points on the display; and
a processing circuitry to change, by using a position of a first character recognizable from at least part of the first strokes and a position of a second character recognizable from at least part of the first strokes, one or more coordinates of at least part of the first strokes corresponding to either the first character or the second character, and to determine whether the first character and the second character overlap,
wherein the display circuitry displays, by using changed coordinates, at least one of the first strokes corresponding to either the first character or the second character and calculates the changing direction and the changing quantity, if it is determined that the first character and the second character overlap.

2. The apparatus of claim 1, the processing circuitry to calculate a changing direction and a changing quantity to correct the coordinate, by using a position of the first character recognizable from the strokes and the position of the second character recognizable from the strokes,
the display circuitry to change a display position of the second character, in accordance with the correction direction and the correction quantity.

3. The apparatus of claim 1, the processing circuitry to generate time-series information comprising stroke data corresponding to the first strokes, the stroke data comprising a coordinate data series corresponding to points located on a locus of a stroke, a writing order of the first strokes recognizable in the stroke data, and to store the time-series information in a storage medium,
the display circuitry to display loci corresponding to the first strokes on the display according to time-series information from the storage medium.

4. The apparatus of claim 3, the processing circuitry to calculate a changing direction and a changing quantity to change the coordinate, by using a position of the first character recognizable from the strokes and the position of the second character recognizable from the strokes, and to change the coordinate data series corresponding to the second character in the time-series information, in accordance with the changing direction and the changing quantity.

5. The apparatus of claim 3, the processing circuitry to generate the time-series information based on the changed coordinates.

6. The apparatus of claim 1, the processing circuitry configured to determine that the first character and the second character overlap, when the number of intersection points between the first character and the second character are equal to or larger than a preset number, and a ratio of an area of a rectangle enclosing the intersection points to an area of a rectangle enclosing the first character and the second character is equal to or larger than a preset value.

7. A method comprising:
detecting a coordinate which indicates a contact position on a display;
displaying, in accordance with the coordinate, first strokes handwritten by a handwriting input operation conducted by contacting on the display;
changing, by using a position of a first character recognizable from at least part of the first strokes and a position of a second character recognizable from at least part of the first strokes, one or more coordinates of at least part of the first strokes corresponding to either the first character or the second character;
displaying, by using the changed coordinates, display at least one of the first strokes corresponding to either the first character or the second character;
determining whether the first character and the second character overlap; and
calculating a changing direction and a changing quantity to change the coordinate, by using a position of the first character recognizable from the strokes and the position of the second character recognizable from the strokes, when it is determined that the first character and the second character overlap.

8. The method of claim 7 further comprising;
calculating a changing direction and a changing quantity to change the coordinate, by using a position of the first character recognizable from the strokes and the position of the second character recognizable from the strokes; and changing a display position of the second character, in accordance with the changing direction and the changing quantity.

9. The method of claim 7 comprising:

generating time-series information comprising stroke data corresponding to the first strokes, the stroke data comprising a coordinate data series corresponding to points located on a locus of a stroke, a writing order of the first strokes recognizable in the stroke data;

storing the time-series information in a storage medium; and reading out the time-series information from the storage medium and displaying loci corresponding to the first strokes on the display according to the readout time-series information.

10. The method of claim 9 further comprising:

calculating a changing direction and a changing quantity to change the coordinate, by using a position of the first character recognizable from the strokes and the position of the second character recognizable from the strokes; and changing the coordinate data series corresponding to the second character in the time-series information, in accordance with the changing direction and the changing quantity.

11. The method of claim 9 comprising generating the time-series information based on the changed coordinates.

12. The method of claim 7 comprising determining that the first character and the second character overlap, when the number of intersection points between the first character and the second character are equal to or larger than a preset number, and a ratio of an area of a rectangle enclosing the intersection points to an area of a rectangle enclosing the first character and the second character is equal to or larger than a preset value.

13. A non-transitory computer-readable storage medium storing computer-executable instructions that, if executed, causes a computer to:

display, in accordance with a coordinate which indicates a contact position on a display, first strokes handwritten by a handwriting input operation conducted by contacting on the display;

change, by using a position of a first character recognizable from at least part of the first strokes and a position of a second character recognizable from at least part of the first strokes, one or more coordinates of at least part of the first strokes corresponding to either the first character or the second character;

displaying, by using the changed coordinates, display one or more of the first strokes corresponding to either the first character or the second character;

determine whether the first character and the second character overlap; and calculate a changing direction and a changing quantity to change the coordinate, by using a position of the first character recognizable from the strokes and the position of the second character recognizable from the strokes, when it is determined that the first character and the second character overlap.

14. The non-transitory computer-readable storage medium of claim 13, if executed, causes the computer to change a display position of the second character, in accordance with the changing direction and the changing quantity.

15. The medium of claim 13, if executed, causes the computer to: generate time-series information comprising stroke data corresponding to the first strokes, the stroke data comprising a coordinate data series corresponding to points located on a locus of a stroke, a writing order of the first strokes recognizable in the stroke data;

store the time-series information in a storage medium; and read out the time-series information from the storage medium and display loci corresponding to the first strokes on the display according to the readout time-series information.

16. The medium of claim 15, if executed, causes the computer to:

calculate a changing direction and a changing quantity to change the coordinate, by using a position of the first character recognizable from the strokes and the position of the second character recognizable from the strokes; and change a coordinate data series corresponding to the second character in the time-series information, in accordance with the changing direction and the changing quantity.

17. The medium of claim 15, if executed, causes the computer to generate the time-series information based on the changed coordinate.

18. The medium of claim 13, if executed, causes the computer to determine that the first character and the second character overlap, when the number of intersection points between the first character and the second character are equal to or larger than a preset number, and a ratio of an area of a rectangle enclosing the intersection points to an area of a rectangle enclosing the first character and the second character is equal to or larger than a preset value.

* * * * *